Patented Jan. 11, 1938

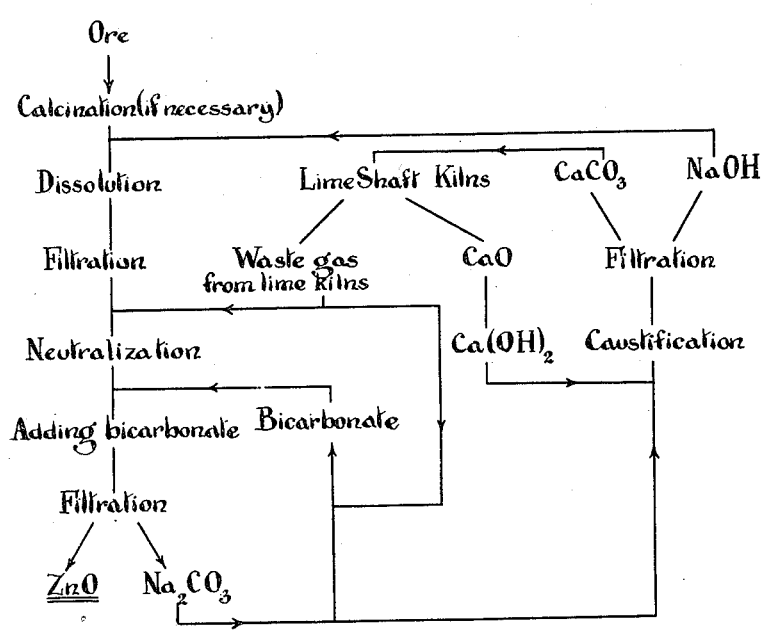

2,105,394

UNITED STATES PATENT OFFICE 2,105,394

MANUFACTURE OF ZINC OXIDE

Riccardo Allavena, Milan, Italy, assignor to Societa Italiana Pirelli, Milan, Italy, a company of Italy Application November 30, 1935, Serial No. 52,438
In Italy December 1, 1934

4 Claims. (Cl. 23—147)

This invention is for improvements in or relating to the manufacture of zinc oxide by the wet process. The improved process comprised by the invention is particularly suitable for the production of zinc oxide in a very finely divided form and of a high degree of activity, especially in rubber mixings.

A number of processes are known for obtaining from zinc ores, zinc oxide to be used either in paints or in rubber mixings. Processes are also known for transforming a zinc oxide having a low covering power into a zinc oxide having a higher covering power. It has been proposed, for example, to dissolve the zinc contained in ores or in waste zinciferous material by means of alkali solutions so as to obtain an alkali zincate solution, wherefrom a precipitate of zinc hydroxide is afterwards separated by dilution of the zincate solution with water, if necessary under pressure and at a temperature above normal atmospheric pressure. This process, however, has never come into practical use as it is expensive and of low efficiency; also, it presents certain practical difficulties in the filtration of the precipitates and the product obtained, being composed mainly of zinc hydroxides, requires further calcination in order to transform it into zinc oxide.

According to another known process, zinc hydroxide is precipitated from a solution of zinc salts by adding thereto carbonates or bicarbonates or oxides or hydroxides of alkali metals or alkaline earth metals. The zinc hydroxide so precipitated is rinsed and filtered, after which the filtered precipitate is suspended in water into which carbon dioxide is bubbled for the transformation of the suspended hydroxide into zinc carbonate, which, after filtration, is subjected to calcination at a temperature of from 300° C. to 400° C. to obtain zinc oxide. This process also is expensive and of a low order of efficiency; also it is difficult to control owing to its complicated character, which fact tends unfavourably to influence the uniformity of the products.

According to the present invention, a process for the direct manufacture of substantially pure zinc oxide, particularly suitable for use in rubber mixings, by precipitation from a solution, consists in treating an aqueous solution of an alkali zincate with a bicarbonate of a metal of which the normal carbonate is soluble in water, the bicarbonate being employed, with respect to the zincate solution, in substantially stoichiometric proportions for the formation of zinc oxide, whereby a precipitate of substantially pure zinc oxide is obtained, filtering the said precipitate and drying it at a temperature not exceeding 100° C.

It is known to produce zinc oxide directly from aqueous solutions of alkali zincates by treatment thereof with gaseous carbon dioxide. In carrying this process into practical effect, however, it is found to require a very careful and continuous control of the reaction, owing to variations which tend to occur in the carbon dioxide content of the gases used in this step. Moreover, for this reason and also owing to the relatively slow activity developed by gaseous carbon dioxide, the reaction tends to be slow, so that the precipitation also proceeds slowly and the zinc oxide particles tend to assume an undesirably large size and to be irregular. By operating in accordance with the present invention these difficulties are avoided in a simple and effective manner.

The bicarbonate is preferably used in the form of a solution of alkali bicarbonate produced by bubbling a gas containing carbon dioxide through a solution of an alkali carbonate so as to transform at least part of the carbonate in solution into bicarbonate. It is also possible, however, when economically convenient, to use solid bicarbonate.

In carrying the process into effect, it has been found to be advantageous to arrange for a continuous operative cycle in which the alkali hydroxide which is employed in the dissolution of the parent zinc material is regenerated after each cycle from the alkali carbonate which is formed in the bicarbonate treatment of the zincate solution. The accompanying diagrammatic representation illustrates a cyclic process of this character. Thus, the sodium hydroxide which has been transformed into carbonate is regenerated by treatment with milk of lime and utilized again in the cycle together with the carbon dioxide developed in the preparation of the calcium oxide from the carbonated milk of lime. By thus arranging the process, the only substances entering into and issuing from the cycle are substantially the initial zinc ore (which may, if necessary, be concentrated and free from impurities) and the precipitated zinc oxide end product of the process.

It has already been proposed to treat a solution of zinc salts with bicarbonates, or with carbonates in the presence of free carbon dioxide, with the object of preparing zinc carbonate. This process, however, is quite different from the present invention, as it employs a solution of zinc salts in place of the zincate solution and it cannot serve for the manufacture of zinc oxide.

The process according to the present invention can be carried out with the employment of zinc containing materials of practically any kind, that is with the use of ores, scrap or waste zinciferous material, zinc salts or the like.

The zincate solution may be obtained by direct alkali treatment of the raw material, the latter having previously been ground to a sufficient degree of fineness of subdivision, provided the zinc contained in the material be already in the form of oxide; in the contrary event, the raw material will be subjected to calcination to oxidize the zinc. By employing raw material containing oxidized zinc, a good quantitative and qualitative efficiency is available in respect of the process, the extraction of the metal being almost complete, with total separation of iron, cadmium and like extraneous constituents which in the dissolution process remain undissolved.

In the case of ores containing only small proportions of zinc, it is preferable to concentrate the material before dissolution, in order to prevent considerable loss of alkali and to follow more closely the process cycle illustrated in the aforesaid diagrammatic representation of the process.

It is also possible, by suitable choice of working conditions, for instance concentration of the solutions, temperatures, rates of precipitation, etc., to vary within certain limits the properties of the zinc oxide obtained. In this manner, it is possible, for example, having at disposal a zinc oxide insufficiently pure or unsuitable for other reasons for certain special applications, to transform and give value to the zinc oxide by subjecting it to the treatment of the invention.

The process as illustrated in the diagram can be carried into effect as follows:—

100 grams of calcinated and ground calamine containing 55 per cent. of ZnO is added to each litre of a 20% boiling solution of NaOH. After the mixture has been boiling for several hours a zincate solution containing about 50 grams of zinc oxide per litre is obtained, which is decanted and filtered.

This solution is generally strongly alkaline and therefore, before beginning the bicarbonate treatment of it, the alkalinity of the solution, from the presence of the caustic alkali therein, is eliminated by bubbling carbon dioxide into the solution until precipitation of zinc oxide begins. The calculated amount of bicarbonate is then added rapidly and preferably under hot conditions, the mass being vigorously stirred during the operation. The resulting precipitate of zinc oxide is rinsed and afterwards dried at a temperature not exceeding 100° C.

A solution of sodium carbonate is left after filtration of the zinc oxide precipitate, which solution, is utilized partly for preparing the bicarbonate required for decomposing the zincate and partly, after causticizing with milk of lime, for dissolving the raw material. Also the carbonate of lime formed in the operation of causticizing the sodium carbonate may be utilized by transforming the same into quick-lime in a suitable kiln, conveying the waste gases rich in carbon dioxide both to the neutralization of the alkaline solution of zincate, and to the preparation of the bicarbonate solution. The invention, therefore, allows the formation of a cycle of production, wherein the only ingredients entering into the cycle and issuing therefrom are substantially the raw zinciferous material and the precipitated zinc oxide end product of the process.

It is obvious that, according to the raw material to be treated, local conditions and so forth, also for the preventing of excessive dilution of the solutions in course of time, the process as described above may be varied considerably in respect of details without departure from the general principle and scope of the invention, as indicated in the following statement of claim.

What I claim and desire to secure by Letters Patent of the United States is:—

1. A process for the direct manufacture of substantially pure zinc oxide by precipitation from a solution, which consists in forming an aqueous solution of an alkali zincate neutralizing the zincate solution to the point of precipitation of zinc oxide, treating the neutralized zincate solution with a bicarbonate of a metal of which the normal carbonate is soluble in water, the bicarbonate being employed, with respect to the zincate solution, in substantially stoichiometric proportions for the formation of zinc oxide, whereby a precipitate of substantially pure zinc oxide is obtained, filtering the said precipitate and drying it at a temperature not exceeding 100° C.

2. A process for the direct manufacture of substantially pure zinc oxide by precipitation from a solution, which consists in forming an alkaline aqueous solution of an alkali zincate, neutralizing the zincate solution to the point of precipitation of zinc oxide by bubbling gaseous carbon dioxide into it, treating the neutralized zincate solution with a solution of a bicarbonate of a metal of which the normal carbonate is soluble in water, the bicarbonate solution being employed, with respect to the zincate solution, in substantially stoichiometric proportions for the formation of zinc oxide, whereby a precipitate of substantially pure zinc oxide is obtained, filtering the said precipitate and drying it at a temperature not exceeding 100° C.

3. A cyclic process for the direct manufacture of substantially pure zinc oxide by precipitation from a solution, which consists in forming an alkaline aqueous solution of an alkali zincate, neutralizing the zincate solution to the point of precipitation of zinc oxide by bubbling gaseous carbon dioxide into it, treating the neutralized zincate solution with a solution of a bicarbonate of a metal of which the normal carbonate is soluble in water, the bicarbonate solution being employed, with respect to the zincate solution, in substantially stoichiometric proportions for the formation of zinc oxide, whereby a precipitate of substantially pure zinc oxide is obtained with the formation of a solution of alkali carbonate, filtering the said precipitate and drying it at a temperature not exceeding 100° C., regenerating a solution of alkali hydroxide from the alkali carbonate solution by treatment thereof with milk of lime and forming a further quantity of alkali zincate solution from the regenerated alkali hydroxide solution by dissolution of zinc oxide bearing material therein.

4. A cyclic process for the direct manufacture of substantially pure zinc oxide by precipitation from a solution, which consists in forming an alkaline aqueous solution of an alkali zincate, neutralizing the zincate solution to the point of precipitation of zinc oxide by bubbling gaseous carbon dioxide into it, treating the neutralized zincate solution with a solution of a bicarbonate of a metal of which the normal carbonate is soluble in water, the bicarbonate solution being employed, with respect to the zincate solution, in substantially stoichiometric proportions for the formation of zinc oxide, whereby a precipitate of substantially pure zinc oxide is obtained with the formation of a solution of alkali carbonate, filtering the said precipitate and drying it at a temperature not exceeding 100° C., regenerating a solution of alkali hydroxide from the alkali carbonate solution by treatment thereof with milk of lime, forming a further quantity of alkali zincate solution from the regenerated alkali hydroxide solution by dissolution of zinc oxide bearing material therein, the said milk of lime being formed in the process from calcium oxide produced with liberation of carbon dioxide by heating the calcium carbonate which is formed in step of treating with milk of lime the solution of alkali carbonate which is formed in the bicarbonate treatment of the zincate solution, regenerating bicarbonate solution from said solution of alkali carbonate with a part of the carbon dioxide which is liberated in the step of heating the calcium carbonate, and neutralizing regenerated zincate solution with a part of the carbon dioxide which is liberated in the step of heating the calcium carbonate, the only ingredients entering into and issuing from the cycle being substantially the parent zinc oxide bearing material from which the zincate solution is formed and the substantially pure zinc oxide which is obtained as the product of the process.

RICCARDO ALLAVENA.